US007823806B2

(12) United States Patent
Schmon

(10) Patent No.: US 7,823,806 B2
(45) Date of Patent: Nov. 2, 2010

(54) CONNECTOR PART FOR CONNECTING A MATERIAL SUPPLY DEVICE TO A SPRAY GUN

(75) Inventor: Ewald Schmon, Grafenberg (DE)

(73) Assignee: Sata GmbH & Co. KG, Kornwestheim (DE)

( * ) Notice: Subject to any disclaimer, the term of this patent is extended or adjusted under 35 U.S.C. 154(b) by 169 days.

(21) Appl. No.: 12/192,814

(22) Filed: Aug. 15, 2008

(65) Prior Publication Data

US 2009/0045623 A1 Feb. 19, 2009

(30) Foreign Application Priority Data

Aug. 18, 2007 (DE) .................. 20 2007 011 604 U

(51) Int. Cl.
*B05B 1/00* (2006.01)

(52) U.S. Cl. ....................... 239/600; 239/290; 239/340; 239/345; 239/379; 239/526; 285/333; 285/401

(58) Field of Classification Search ................. 239/290, 239/296, 328, 340, 345, 346, 379, 525, 526, 239/600; 285/358, 360, 361, 401, 402, 332, 285/333
See application file for complete search history.

(56) References Cited

U.S. PATENT DOCUMENTS 7,036,752 B1 * 5/2006 Hsiang ....................... 239/379
7,083,119 B2 * 8/2006 Bouic et al. ................. 239/345
7,090,148 B2 * 8/2006 Petrie et al. ................. 239/600
7,165,732 B2 * 1/2007 Kosmyna et al. ............ 239/346
7,172,139 B2 * 2/2007 Bouic et al. ................. 239/345
7,374,111 B2 * 5/2008 Joseph et al. ............... 239/600

FOREIGN PATENT DOCUMENTS

DE 102 05 831 A1 8/2003
DE 10 2004 003 438 A1 8/2005
DE 10 2004 007 733 A1 9/2005
FR 789762 11/1935

* cited by examiner

*Primary Examiner*—Steven J Ganey
(74) *Attorney, Agent, or Firm*—Martin Fleit; Paul D. Bianco; Fleit Gibbons Gutman Bongini & Bianco PL

(57) ABSTRACT

A connector part (3) for connecting a material supply device (10) to a spray gun (20) that includes a hollow cylindrical connection piece (5); a threaded wedge element (8) with a lower starting point (8*a*) and an upper end (8*b*) running around the outer circumference of connection piece (5) and serving to produce a threaded wedge connection to a counter-element (15) arranged on gun base (19) of spray gun (20); and a stop element (14) that forms a limit stop during the production of the threaded wedge connection. In order to prevent the counter-element on the spray gun from digging into the soft connection pipe made of plastic and removing plastic chips there, it is provided in the connector part according to the invention that stop element (14) is arranged at a distance in the circumferential direction from upper end (8*b*) of threaded wedge element (8), whereby a gap (11) is formed between stop element (14) and upper end (8*b*) of the threaded wedge element. In additional embodiments of the invention it is provided that the inclination of threaded wedge element (8) runs more steeply at lower starting point (8*a*) than in the other area, or that threaded wedge element (8) has a smaller cross section in the axial direction at lower starting point (8*a*) or at upper end (8*b*) than in its central area.

23 Claims, 3 Drawing Sheets

(a)

(b)

CONNECTOR PART FOR CONNECTING A MATERIAL SUPPLY DEVICE TO A SPRAY GUN

FIELD OF THE INVENTION

The invention relates to a connector for connecting a material supply device to a spray gun.

BACKGROUND OF THE INVENTION

A connector of this class is already known from DE 10 2004 003 438 A1. Therein a gravity cup produced as an injection-molded part from plastic for a paint spray gun is known, that has a cup-like container and a lid that can be placed onto the container. A connector part, having a hollow cylindrical connection piece with a threaded wedge element running around the outer circumference of this connection piece, is molded onto the lid for direct attachment of the gravity cup to a paint spray gun. The threaded wedge element serves to produce a threaded wedge connection to a counter-element on the gun base of the paint spray gun. Due to the cooperation of the threaded wedge element with the counter-element on the spray gun base, the gravity cup can be quickly and easily connected to the spray gun and again detached from it. In order that the threaded wedge element not be turned too far during placement of the gravity cup on the paint spray gun, a stop element that forms a limit stop during the production of a threaded wedge connection between the gravity cup and the paint spray gun is provided at the end of the threaded wedge element.

Since the connection piece, like the lid of the gravity cup, is manufactured from plastic, and the counter-element on the spray gun base is manufactured from metal, there is the problem in the production of the threaded wedge connection with the known connector part-caused by manufacturing tolerances that the harder counter-element digs into the comparatively softer connection piece made of plastic, and in particular, into the threaded wedge element. During the detachment of the threaded wedge connection by turning back the lid from the counter-element, it is also possible for a plastic chip on the upper side of the threaded wedge element to be peeled off due to the resiliency of the plastic. First, the threaded wedge element is thereby damaged and is further worn away each time the gravity cup is placed on the spray gun, which leads to a less tight seating of the gravity cup lid on the spray gun base. Second, due to the removal of plastic material on the connection pipe by the cutting of the metallic counter-element into the plastic material, plastic chips are created, which have an extremely disruptive effect during painting and are extremely undesirable because they can contaminate the surface to be painted, or damage the painted surface.

SUMMARY OF THE INVENTION

Starting from this point, the invention is based on the problem of improving a connector part of the present class in such a manner that the above-mentioned drawbacks no longer occur. This problem is solved by a connector part with the characteristics of the independent claim. Preferred configurations and applications of the connector part can be deduced from the dependent claims.

BRIEF DESCRIPTION OF THE DRAWINGS

The invention will be explained in detail below on the basis of an embodiment with reference to the accompanying drawings. The drawings show.

DETAILED DESCRIPTION OF THE INVENTION

The connector part according to the invention serves to connect a material supply device to a spray gun. In the embodiment described below, the material supply device is a paint container for a gravity-cup paint spray gun. The connector part according to the invention can be used, however, on other material supply devices and for other types of spray guns. For example, it can also be arranged at one end of a material supply device that can be flanged onto a spray gun via the connector part.

Figure 1:
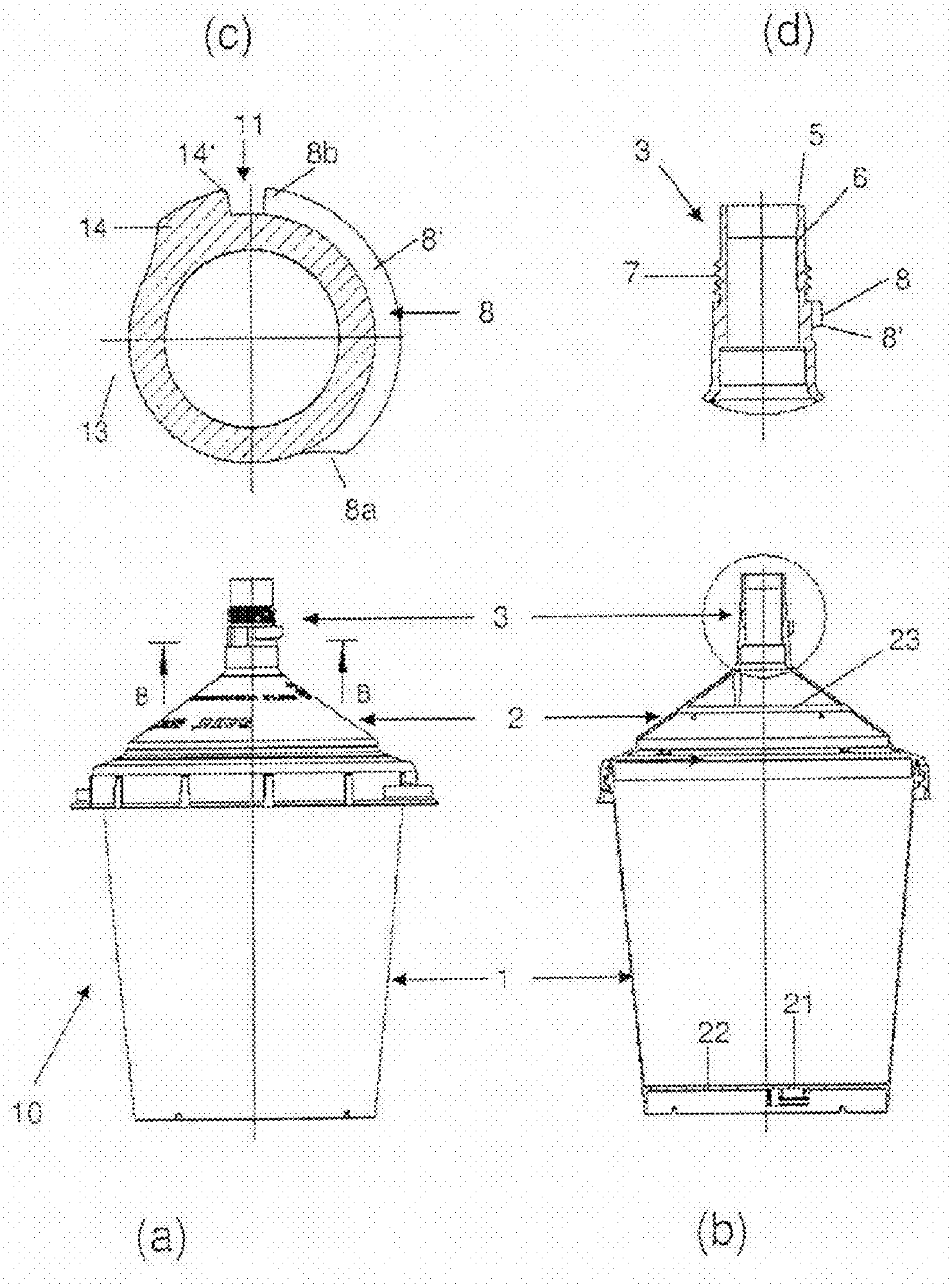
FIG. 1*a*, a side view of the paint container for a paint spray gun, comprising a paint cup and a lid that can be placed thereon that has a connection piece according to the invention.
FIG. 1*b*, a representation of the paint container of FIG. 1*a* in section.
FIG. 1*c*, a sectional representation of the connector part of the paint container of FIG. 1*a* along line B-B.
FIG. 1*d*, a detail view of the connection piece of a container from FIG. 1*b* in cross section.

The gravity cup represented in a side view in FIG. 1*a*, which represents a material supply device 10, contains a cup-like container 1 and a lid 2 that can be placed thereon, onto which a connector part 3 for detachable mounting of the gravity cup on a spray gun 20 is formed. A spray gun 20 with a material supply device 10 placed thereon, namely the gravity cup shown in FIG. 1*a*, is represented in FIG. 2*a*. Both container 1 and lid 2 are expediently manufactured as injection-molded parts from plastic, and connector piece 3, which comprises a hollow cylindrical connection piece 5, is preferably integrally formed on lid 2. Lid 2 is removed from container 1 so that it can be filled with a liquid to be sprayed, and is screwed fluid-tightly back onto container 1 after being filled. Hollow cylindrical connection pipe 5 of connector part 3 can subsequently be inserted fluid-tightly into connection hole 18 of a spray gun 20 turned upside down. To spray out the liquid filled into the gravity cup, spray gun 20 is then turned over so that the gravity cup is on the upper side of the paint spray gun. In this position, the fluid to be sprayed out can flow out of the gravity cup through hollow cylindrical connection pipe 5 through the connection hole and into the spraying channel of spray gun 20.

In order to guarantee venting of the gravity cup, a venting valve 21 is provided in base 22. Venting valve 21 can be reclosed after the spraying process, whereby it is assured that the gravity cup can removed from spray gun 20 after the spraying process has finished, and can be used for storing the not yet sprayed fluid. A screen 23 is provided in lid 2 in order to filter the liquid flowing from the gravity cup into the spray gun.

The connector part 3 represented in section and enlarged in FIGS. 1*c* and 1*d*, respectively, consists of a hollow cylindrical connection piece 5 molded onto or otherwise formed onto lid 2. On its outside, connection piece 5 has a front cylindrical guide area 6 and adjoining external threads 7. Guide area 6 serves for centered introduction of connection piece 5 into the connection hole 18, shown in a sectional view in FIGS. 2*a* and 2*b*, in spray gun base 19. The external threads 7 are provided so that connector part 3 can also be screwed into conventional internal thread in hole 18 in spray gun base 19 of a spray gun 20. A threaded wedge element 8, adjoining external threads 7 and running around the outer periphery of connection piece 5, is molded onto the outer periphery of connection piece 5. Threaded wedge element 8 has the form of an external thread pitch running only partway around the outer periphery of connection piece 5, and preferably has a triangular or trapezoidal profile. Threaded wedge element 8 preferably runs over less than half the periphery of connection piece 5. Threaded wedge element 8 has a lower starting point 8*a* and an upper end 8*b* (FIG. 1*c*). The underside of threaded wedge element 8 shown in FIGS. 1*c* and 1*d* forms an active surface 8'. Threaded wedge element 8 serves to produce a threaded wedge connection between connector part 3 and gun base 19 of spray gun 20.

Figure 2:
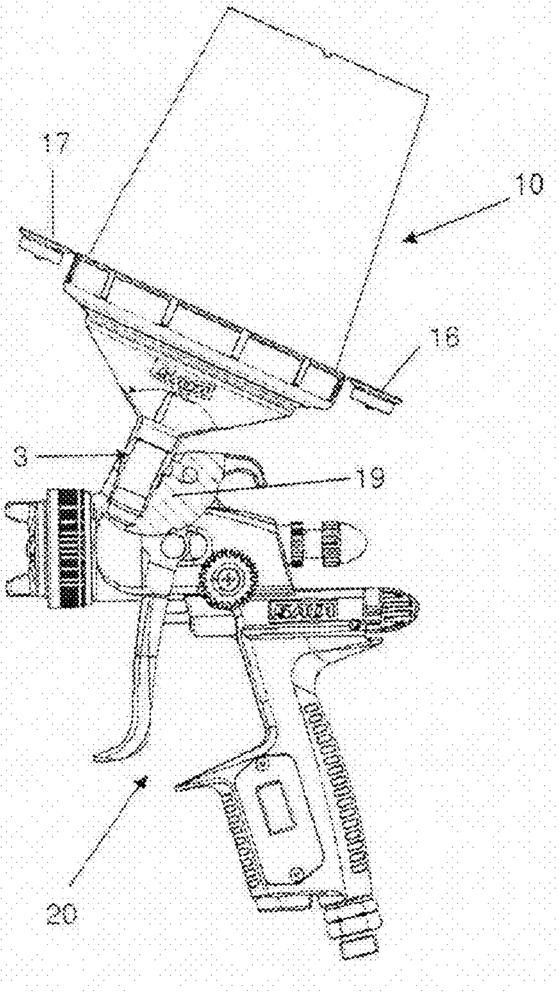
FIG. 2*a*, a side view of a paint spray gun and a paint container placed thereon in accordance with the embodiment of FIG. 1.
FIG. 2*b*, a detail of the connection between the paint container and the paint spray gun of FIG. 1*a* in a sectional representation.
Figure 2:
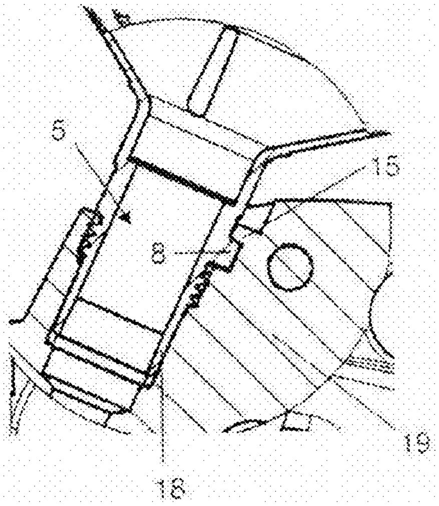

To produce the threaded wedge connection, a counter-element 15 is formed on gun base 19 of spray gun 20, which is constituted in the embodiment of spray gun 20 shown in FIG. 2 by a one-sided projection above the receiving hole 18 of gun base 19. The projection that constitutes counter-element 15 is preferably a wedge-shaped projection, the thickness of which can increase continuously from one end to the other, and which is made of metal, like spray gun base 19. To produce the threaded wedge connection, active surface 8' of threaded wedge element 8 is brought into engagement with counter-element 15 on the spray gun base.

As follows from the sectional representation of FIG. 1*c*, a stop element 14 is formed on the outer periphery of connection piece 5 a distance away from upper end 8*b* of threaded wedge element 8 in the peripheral direction. Stop element 14 has a stop surface 14' opposite upper end 8*b* of threaded wedge element 8. Accordingly, a gap 11 is formed in the peripheral direction between stop surface 14' and upper end 8*b* of threaded wedge element 8. Stop element 14 thus forms an abutment projecting from the outer periphery of connection piece 5 that produces a rotation limitation of connector part 3 (and thus of lid 2) with respect to spray gun 19 when the threaded wedge connection is being tightened. The projection on spray gun base 19 can be furnished without a wedge-shaped inclination, however. As an alternative embodiment, not shown graphically here, one can also consider an embodiment in which counter-element 15 is formed on the spray gun base as a wedge-shaped threaded wedge element, which cooperates with a corresponding counter-element on connection pipe 5, in which case the counter-element on connection piece 5 can be formed with or without a wedge-shaped inclination.

Between lower end 8*a* of threaded wedge element 8 and stop element 14, a cutout 13 for the engagement of counter-element 15 on spray gun 20 is formed on the outer periphery of connection pipe 5. To fix the gravity cup on spray gun 20, connector piece 3 is first introduced into receiving hole 18 in spray gun base 19 in which counter-element 15 can engage with the cutout 13 on connection piece 5. In this position, guide area 6 of the connection piece can be pushed into receiving hole 18 in spray gun base 19 until the upper side of connection piece 5 rests against a sealing surface in receiving hole 18, which can be formed by an annular gasket, for example. In order to produce the threaded wedge connection, threaded wedge element 8 can be subsequently brought into engagement with counter-element 15 on spray gun base 19 by a rotation of connector part 3, or the lid 2 formed on it, with respect to spray gun base 19.

The extent of threaded wedge element 8 in the circumferential direction is preferably selected such that even at one-quarter to one-half a rotation of connection piece 5, active surface 8' on threaded wedge element 8 lies against counter-element 15 with a corresponding surface, whereby connection piece 5 is clamped tightly with a form fit on gun base 19. Stop element 14 prevents connector part 3 from being turned too far with respect to spray gun base 19, because it forms a stop that limits rotation as the threaded wedge connector is being closed, when counter-element 15 comes to rest against stop surface 14'. Due to the gap 11 between upper end 8*b* of threaded wedge element 8 and stop surface 14' of stop element 14, counter-element 15 cannot cut into the soft plastic of connection piece 5 or of resilient threaded wedge element 8, and chips from connection piece 5 or from threaded wedge element cannot be removed by counter-element 15, if due to manufacturing tolerances, the inclination or the position (bracing) of the threaded wedge element 8 is somewhat larger than should be provided. Gap 11 on the periphery of connection piece 5 is preferably somewhat more narrow in the circumferential direction than the extent of counter-element 15 in the circumferential direction, and it is particularly preferred that the circumferential extent of counter-element 15 be roughly four to ten times as wide as the width of gap 11.

Figure 4:
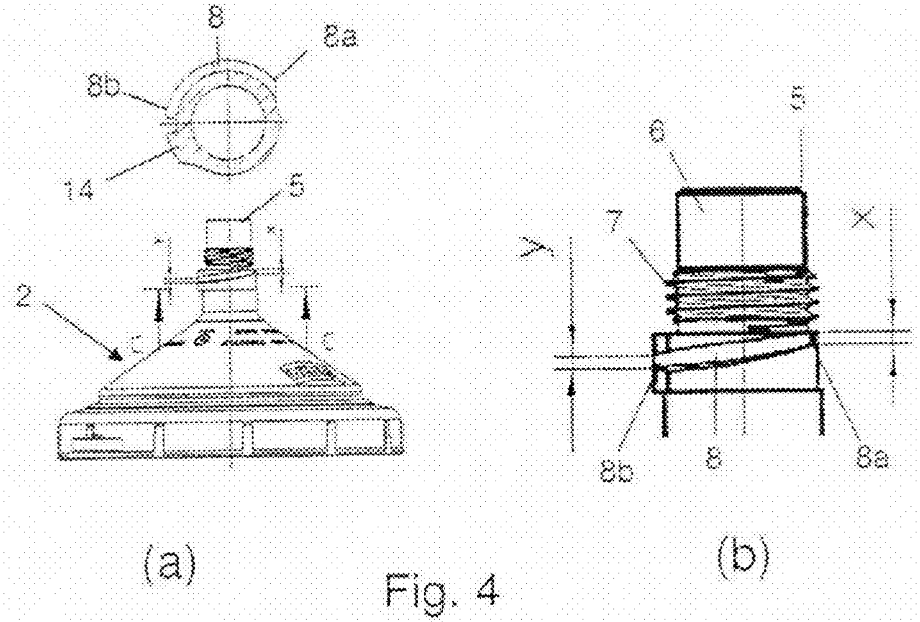
FIG. 4*a*, a side view of a gravity cup for a spray gun with a molded-on connection piece in another alternative embodiment and a cross-sectional view in the area of the connection piece (top)
FIG. 4*b*, a detail view of the connection piece for the gravity cup from FIG. 4*a;*

FIG. 4 shows an embodiment of the invention in which the inclination of threaded wedge element 8 along the circumference of connection piece 5 does not increase linearly, but is instead formed to be somewhat steeper in the direction of lower starting point 8*a* of threaded wedge element 8 than in the other areas. The thickness of threaded wedge element 8, i.e., its extent in the axial direction, is of equal size at lower starting point 8*a* and at upper end 8*b*, i.e., the thickness y at upper end 8*b* corresponds approximately to the thickness x at lower starting point 8*a* (FIG. 4*b*). The peeling off of plastic chips on active surface 8' of threaded wedge element 8 during the loosening of the threaded wedge connection can be prevented in this way. In order to prevent counter-element 15 from cutting in during turning of threaded wedge element 8 during the production of the threaded wedge connection, it is also possible to provide a shallower inclination or a smaller cross section at upper end 8*b* than in the middle area.

Figure 3:
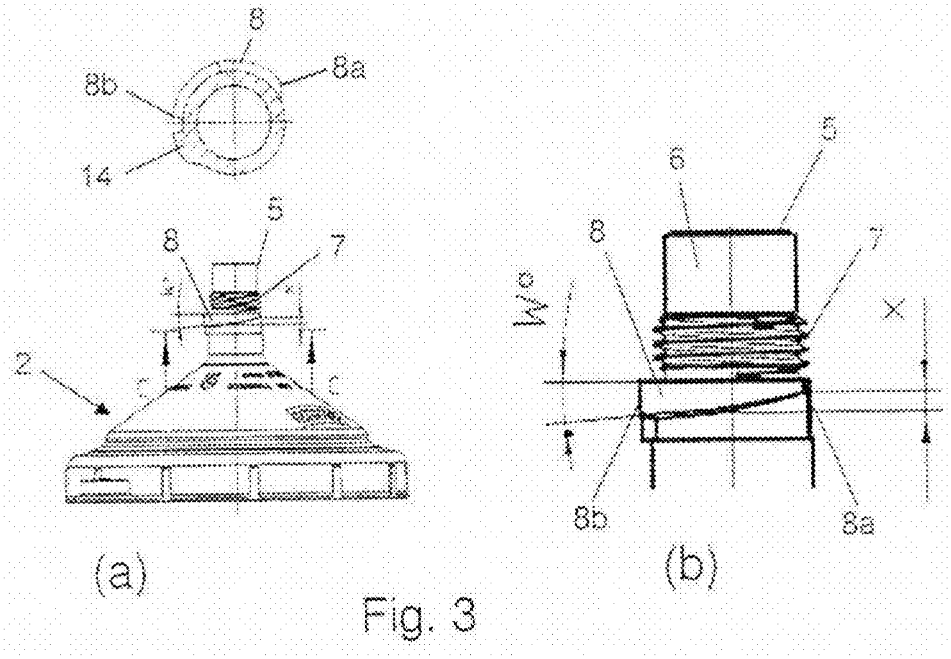
FIG. 3*a*, a side view of a gravity cup for a spray gun with a molded-on connection piece in an alternative embodiment and a cross-sectional view in the area of the connector piece (top)
FIG. 3*b*, a detail view of the connection piece for the gravity cup from FIG. 3*a;*

The same effect can be achieved by a smaller cross section of threaded wedge 8 at lower starting point 8*a* than in the axial direction. This embodiment of the invention is represented in FIG. 3, in which the thickness of threaded wedge element 8 (i.e., its extent in the axial direction) continuously increases from lower starting point 8*a* to upper end 8*b*. The inclination of threaded wedge element 8 is larger at lower starting point 8*a* than in the central area.

The connector part according to the invention is not limited to use on the lid of a gravity cup for a paint spray gun. It can also be formed onto other material supply devices, such as a material supply hose for a spray gun. It can also be constructed as an adapter for connecting a container to a spray gun, in order to be able to attach containers that do not have a connector part that fits the connection hole in the spray gun base. The connector part can also be formed on the bottom of a container for a spray gun.

The invention claimed is:

1. A connector part for connecting a material supply device to a spray gun comprising:

a hollow cylindrical connection piece;

a threaded wedge element with a lower starting point and an upper end running around an outer circumference of said connection piece and serving to produce a threaded wedge connection to a counter-element arranged on a gun base of spray gun; and a stop element that forms a limit stop during the production of the threaded wedged connection, the stop element arranged a distance away from said upper end of said threaded wedge element, whereby a gap is formed between said stop element and said upper end of the threaded wedge element.

2. The connector part according to claim 1, wherein an inclination of said threaded wedge element is steeper at the lower starting point than in a remaining area.

3. The connector part according to claim 1, wherein the threaded wedge element, at said lower starting point or said upper end, has a smaller cross section than at a central area.

4. The connector part according to claim 1, wherein said connector part is made of plastic.

5. The connector part according to claim 1, wherein the hollow cylindrical connection piece is integrally formed on the material supply device.

6. The connector part according to claim 1, wherein the threaded wedge element is constructed as a wedge profile projecting from said connection piece, and said stop element is constructed as an abutment projecting from the connection piece with a stop surface.

7. The connector part according to claim 1, wherein the threaded wedge element is constructed in the form of an outside thread running only in part around an outer periphery of connection piece.

8. The connector part according to claim 1, wherein the connector piece contains a guide area for lateral guidance inside a receiving hole in a gun base of the spray gun.

9. The connector part according to claim 1, wherein the threaded wedge element contains a continuously rising active surface for lying against a corresponding counter-surface of said counter-element.

10. The connector part according to claim 1, wherein the threaded wedge element has a triangular or trapezoidal profile.

11. The connector part according to claim 1, wherein a cutout for insertion of the connector part into the gun base is provided between said lower starting point and said upper end of said threaded wedge element.

12. The connector part according to claim 1, wherein the threaded wedge element runs across less than half a circumference of said connection piece.

13. The connector part according to claim 1, wherein said connection piece has an anterior cylindrical guide area and adjoining external threads on an outer side.

14. A paint spray gun, comprising:

a connector, including a hollow cylindrical connection piece, a threaded wedge element with a lower starting point and an upper end running around an outer circumference of said connection piece and serving to produce a threaded wedge connection to a counter-element arranged on a gun base of spray gun, and a stop element that forms a limit stop during the production of the threaded wedged connection, the stop element arranged a distance away from said upper end of said threaded wedge element, whereby a gap is formed between said stop element and said upper end of the threaded wedge element;

a lid integrally formed with said connector; and a cup coverable by said lid.

15. The paint spray gun according to claim 14, further comprising a venting valve proximate a bottom of the cup.

16. The paint spray gun according to claim 15, wherein cover caps, for closing off said connection piece and said venting valve, are formed on said lid, and can be detached from said lid via a designed tear point.

17. The paint spray gun according to claim 14, further comprising a liner connectable with said cup.

18. The paint spray gun according to claim 14, further comprising a screen positioned adjacent to said connector, for filtering a spray liquid disposed in said cup.

19. The paint spray gun according to claim 14, further comprising a liner cover connectable with said cup.

20. A paint spray gun, comprising:

a connector, including a hollow cylindrical connection piece, a threaded wedge element with a lower starting point and an upper end running around an outer circumference of said connection piece and serving to produce a threaded wedge connection to a counter-element arranged on a gun base of spray gun, and a stop element that forms a limit stop during the production of the threaded wedged connection, the stop element arranged a distance away from said upper end of said threaded wedge element, whereby a gap is formed between said stop element and said upper end of the threaded wedge element;

a gun base; and a paint container;

wherein the connector connects to and joins said gun base and said paint container.

21. The paint spray gun according to claim 20, wherein a counter-element extends from said paint spray gun forming a one-sided projection above a receiving hole of said gun base.

22. The paint spray gun according to claim 21, wherein said gap formed in said connector has a width that is narrower in a circumferential direction than an extent of said counter-element in the circumferential direction.

23. The paint spray gun according to claim 22, wherein the extent of said counter-element in the circumferential direction is four to ten times wider than the width of said gap.

* * * * *